(12) United States Patent
Ciriello

(10) Patent No.: US 6,230,857 B1
(45) Date of Patent: May 15, 2001

(54) UNWIND STAND TENSION BRAKE FRICTION PAD

(75) Inventor: Anthony Ciriello, South Portland, ME (US)

(73) Assignee: Dover Flexo Electronics, Inc., Rochester, NH (US)

( * ) Notice: Subject to any disclaimer, the term of this patent is extended or adjusted under 35 U.S.C. 154(b) by 0 days.

(21) Appl. No.: 09/288,479

(22) Filed: Apr. 8, 1999

(51) Int. Cl.[7] ........................................ F16O 69/00

(52) U.S. Cl. ............................................ 188/250 E

(58) Field of Search .................. 188/68, 73.37, 188/250 A, 250 E, 250 D

(56) References Cited

U.S. PATENT DOCUMENTS

| 5,518,088 | * | 5/1996 | Brosilow | .............. | 188/73.37 |
| 5,706,917 | * | 1/1998 | Matsuzaki | .............. | 188/73.38 |
| 5,842,546 | * | 12/1998 | Biswas | .............. | 188/73.37 |

* cited by examiner

*Primary Examiner*—Christopher P. Schwartz
*Assistant Examiner*—C. T. Bartz
(74) *Attorney, Agent, or Firm*—Davis & Bujold, P.L.L.C.

(57) ABSTRACT

A friction pad assembly having a backplate fast with a pad support body for use in a brake of an unwind stand of a printing press to reduce or eliminate brake squeal. The friction pad reduces brake squeal by the method of affixing the backplate to the mounting body so that the friction pad and pad support are accoustically decoupled from the backplate.

7 Claims, 2 Drawing Sheets

UNWIND STAND TENSION BRAKE FRICTION PAD

FIELD OF THE INVENTION

This invention relates to a device to substantially reduce or eliminate brake squeal of a brake when applying tension to an industrial continuous material, for example: a paper web, wire, etc. from an unwind stand of an industrial process machine for example: a printing press, coating machine, etc. and, more particularly, to a friction pad having a backplate structure to eliminate that squeal.

BACKGROUND OF THE INVENTION

In printing press operations a variety of pneumatic brakes have been employed in an unwind stand of the press. Such brakes may be standard dual disc brakes, universal actuator brakes, single disc brakes, pod-style brakes, and caliper brakes. Typically, these brakes, when used to brake an unwinding roll of paper installed on the unwind stand, squeal adding noise to the surrounding environment making conservation difficult and operator discomfort a problem.

Therefore what is needed is a friction pad that reduces squeal to minimize noise pollution, resulting from such brakes, in the environment surrounding a printing press.

SUMMARY OF THE INVENTION

Wherefore, it is an object of the present invention to overcome the aforementioned problems and drawbacks associated with the prior art designs.

One object of the invention is to provide a friction pad that reduces brake squeal in printing press environs.

Another object of the invention is to improve safety and fatigue of a printing press operators by providing squeal free brake-pads to reduce environmental noise and pollution.

According to the invention, there is provided an anti-squeal friction pad assembly, for an unwind stand tension brake of a printing press, comprising: a backplate having a mounting surface, a pad support body having a brake pad attached thereto, said support body being fast with said mounting surface at discrete locations of said support body.

Also according to the invention there is provided an unwind stand of a printing press having a tension disk brake including an anti-squeal friction pad assembly; the assembly comprising; a backplate having a mounting surface, a pad support body having a brake pad attached thereto, said support body being fast with said mounting surface at discrete locations of said support body.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
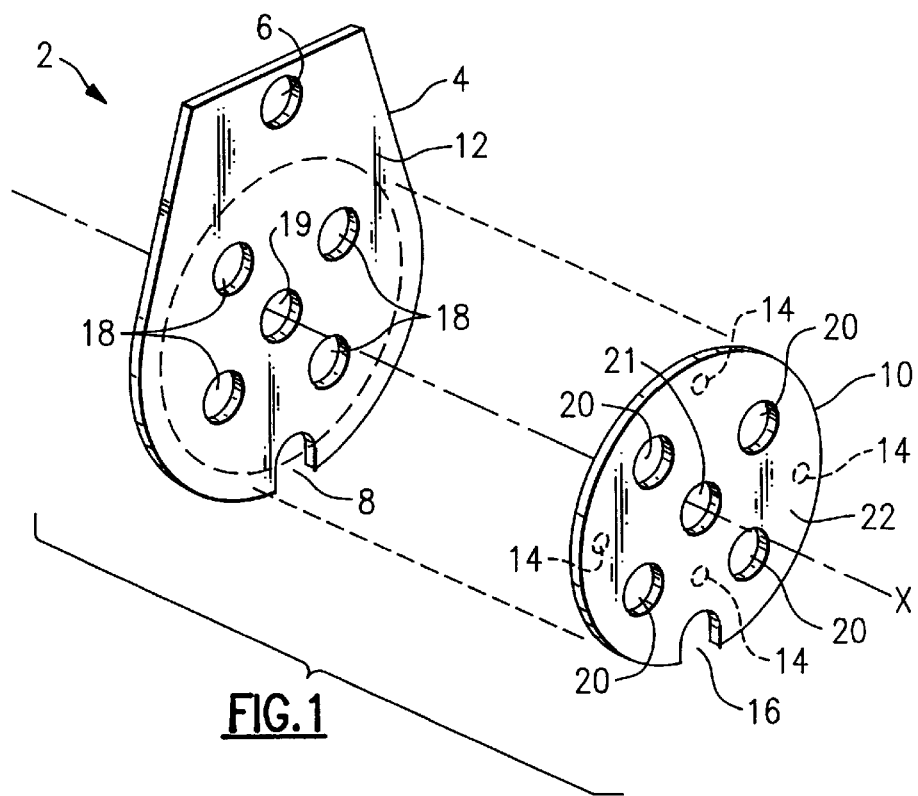
FIG. 1 is an diagrammatic exploded view a preferred embodiment of a friction pad back plate structure according to the present invention.
Figure 2A:
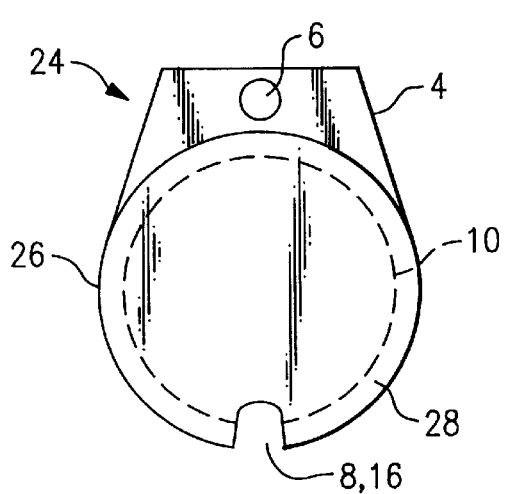
FIGS. 2A and 2B are diagrammatic views of a preferred embodiment of a friction pad assembly according to the present invention.
Figure 2B:
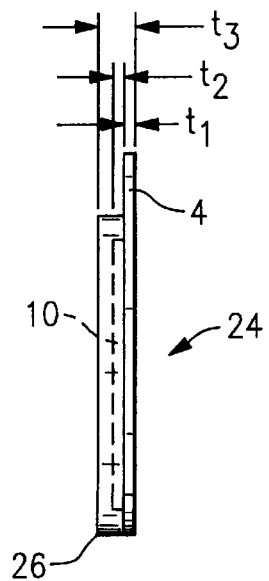
Figure 3:
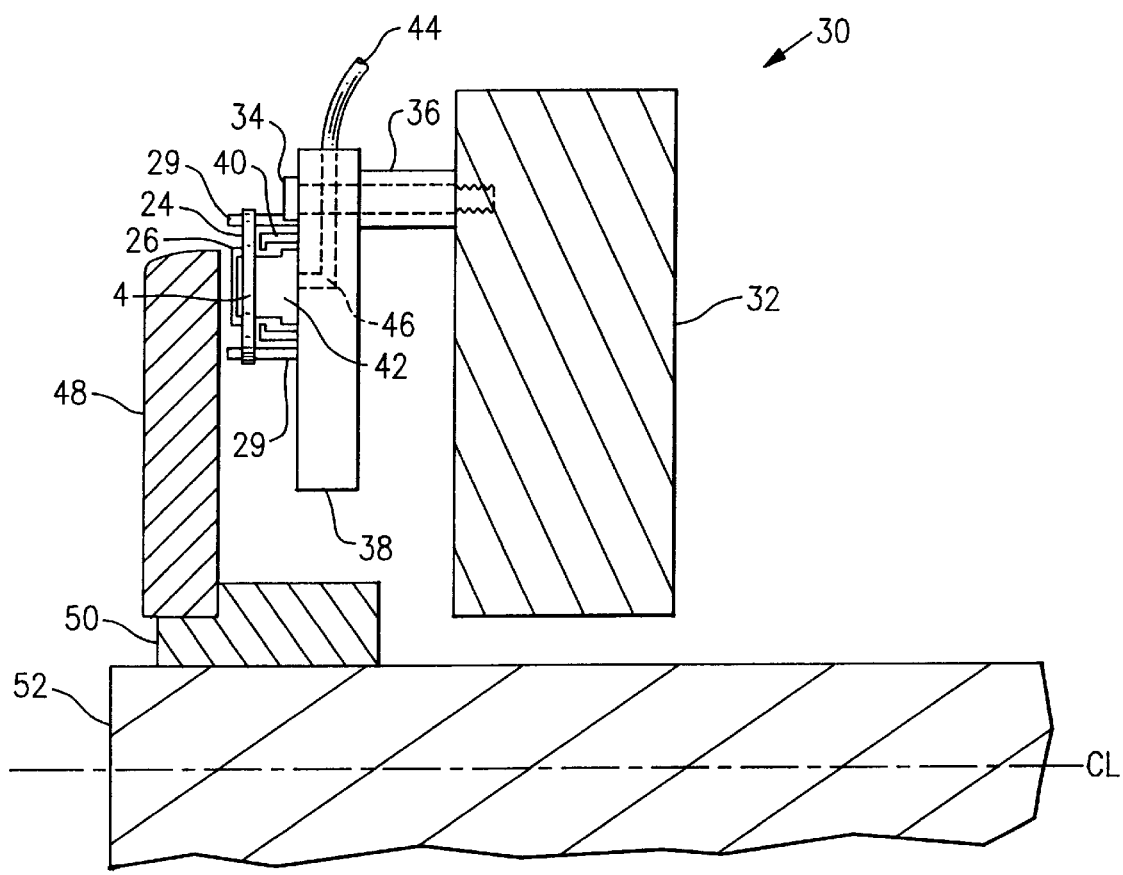
FIG. 3 is a diagrammatic view of a brake assembly used with an unwind stand and using a brake pad assembly according to the present invention.

Turning now to FIGS. 1–3, a detailed description concerning the present invention will be provided.

FIG. 1 shows a friction pad back plate structure 2 according to the present invention. A flat backplate 4 is provided with a pad locating opening 6. Further provided on the backplate, opposed from the opening hole 6, is a pad locating cutout 8. Both the opening 6 and the cutout 8 have a diameter of about 0.50 to 0.55 inch. The structure 2 is further provided with a flat circular support plate 10 that is mounted to a mounting surface 12 of the backplate 4. The support plate 10 is spot-welded to the backplate 4 at four locations 14 evenly spaced circumferentially around the plate 10 about $\frac{1}{8}$ to $\frac{1}{4}$ inch from the outer edge of the plate 10. The support plate 10 is provided with a cutout 16 sized to correspond with the cutout 8 of the backplate body 4. The backplate body and the support plate are provided with aligned throughbores 18, 19, 20, 21. The diameter of each throughbore is about 0.50 to 0.55 inch. The throughbores consist of central throughbores 19, 21, aligned along axis X, with four matching satellite throughbores 18, 20 evenly spaced about axis X. Further, it is to be appreciated that brake pad friction material (not shown in FIG. 1) is mounted to the support surface 22 of the support plate 10 to complete the friction pad assembly 24.

FIGS. 2A and 2B illustrate an assembled anti-squeal friction-pad assembly 24 with friction pad 26 in the form of a brake pad friction material 26 fast therewith. Although an optional feature, the material 26 covers a perimeter portion 28 encasing support plate 10 (see FIG. 2B). It is to be appreciated that when the material 26 is affixed to the perimeter portion 28 of the backplate 4, the opening 6 and cutouts 8, 16 are unobstructed so that two appropriately sized studs 29 (see FIG. 3), by using opening 6 and cutouts 8, 16 prevent rotation of the friction pad assembly 24 relative to a structure of an unwind stand (see FIG. 3). In this embodiment, the backplate 4 and support plate 10 have an thickness $t_1$ and $t_2$ of about 0.05 to 0.1 inch, giving the friction pad assembly 24 a thickness $t_3$ of about 0.3 to 0.5 inch.

Turning now to FIG. 3, there is shown a diagrammatic sectional view of a printing press unwind stand 30 illustrating a disk brake having a friction pad of the present invention. A stationary machine frame 32 of the unwind stand 30 supports, via a bolts and spacer 34, 36 (one only being shown), an backing plate 38. The plate 38 supports a pneumatic cylinder housing 40 having a piston 42. Restrained, by the opening 6 and cutouts 8,16 on guide studs 29, the friction pad assembly 24 is moveable into frictional engagement with a brake disk 48. It is to be appreciated that a pressurized air supply 44, via a supply port 46 provided in the actuator plate 38, operates the air cylinder assembly 40, 42 to move the friction material 26 of the friction pad assembly 24 to engage the brake disk 48. The brake disk 48 is connected, via a hub assembly 50, to a rotatable shaft 52 of the unwind stand. When the friction pad assembly 24 engages the braking disk 48 and the shaft 52 of the unwind stand 30 supporting a roll of paper (not shown) is braked to apply a desired tension to a web of the paper in dependence on the pressure derived from the air supply and the friction of the pad engagement with the disk. By the construction here described, the presence of brake squeal in brakes found in the prior art of such apparatus is greatly reduced or eliminated.

It is to be appreciated that the pad support plate 10 to which the brake pad friction material 26 is attached may be attached to the mounting surface 12 of the backplate 4 as described above to provide the mounting at discrete locations using any number of methods well known to those skilled in the art, e.g. spot welding, brazing, adhesives, including epoxy adhesives, rivets, etc. . . Also that such mounting methods may be utilized generally anywhere on the support plate 10 including around at least a portion or the entirety of its perimeter. Furthermore, that such above mentioned methods of mounting the support plate 10 to the backplate 4 result in the support plate 10 being fast with but acoustically decoupled from the backplate 4.

What is claimed is:

1. An anti-squeal friction pad assembly, suitable for use in an unwind stand tension brake of a printing press, the friction pad assembly comprising:

a backplate having a mounting surface, a brake pad support body fast with said mounting surface, permanently affixed at discrete locations of said support body whereby the brake pad support body is acoustically decoupled from the mounting surface;

a brake pad attached to the brake pad support body; and said brake pad support body being made fast with said mounting surface at discrete locations of said support body by adhesives.

2. The anti-squeal friction pad assembly of claim 3, wherein said throughbores consist of one centrally aligned throughbore and four satellite throughbores.

3. The anti-squeal friction pad assembly of claim 1, wherein said backplate body and said support body have aligned throughbores engaging said brake pad.

4. The anti-squeal friction pad assembly as set forth in claim 1, wherein said adhesive is an epoxy adhesive.

5. The anti-squeal friction pad assembly as set forth in claim 1 wherein said brake pad support body being made fast with said mounting surface on at least a portion of a perimeter of said support body.

6. The anti squeal friction pad assembly as set forth in claim 1 wherein said brake pad covers a perimeter edge portion of the brake pad support body to encase the entire brake pad support body between the brake pad and mounting surface of the backplate 4.

7. An anti-squeal friction pad assembly, suitable for use in an unwind stand tension brake of a printing press, the friction pad assembly comprising:

a backplate having a mounting surface, a brake pad support body adapted to support a brake pad having a support surface supporting a brake pad attached thereto, and a back surface fast with said mounting surface, the back surface permanently affixed at discrete locations to said support body whereby the brake pad support body is acoustically decoupled from the mounting surface; and wherein said brake pad covers a perimeter edge portion of the brake pad support body to encase the entire brake pad support body between the brake pad and mounting surface of the backplate.

* * * * *